Nov. 25, 1958    I. B. HUMPHREYS    2,861,692
THICKENING APPARATUS FOR INCREASING THE
SOLID CONTENT OF LIQUIDS
Filed June 28, 1956    2 Sheets-Sheet 1
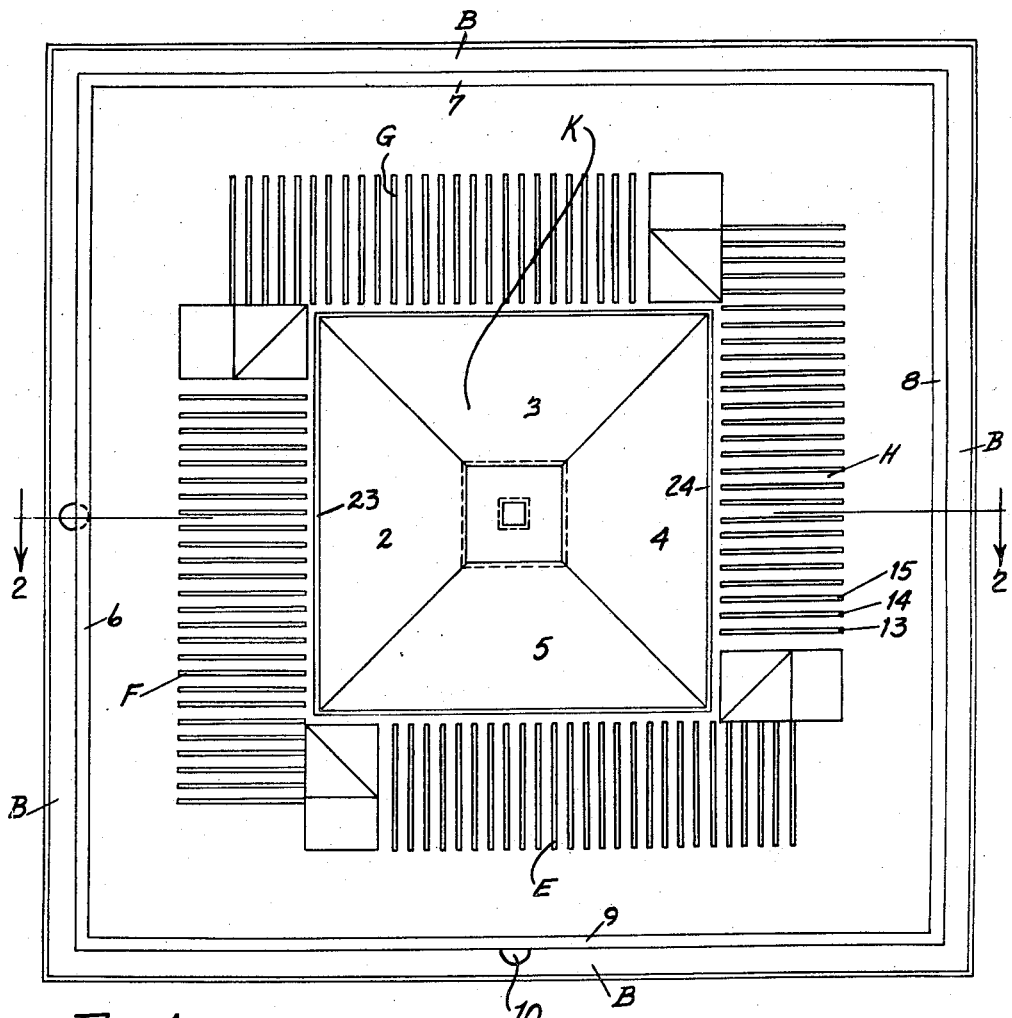
Fig. 1
INVENTOR.
IRA B. HUMPHREYS
ATTORNEY Nov. 25, 1958

I. B. HUMPHREYS 2,861,692

THICKENING APPARATUS FOR INCREASING THE
SOLID CONTENT OF LIQUIDS

Filed June 28, 1956

INVENTOR.
IRA B. HUMPHREYS
BY
ATTORNEY 2,861,692

THICKENING APPARATUS FOR INCREASING THE SOLID CONTENT OF LIQUIDS

Ira B. Humphreys, Denver, Colo.

Application June 28, 1956, Serial No. 594,570

3 Claims. (Cl. 210—521)

This invention relates to what I term a thickener which was specifically conceived and designed for use in a wet mill operation, but the inventive concept is capable of other uses.

In the wet mill operation a suction dredge operates on a body of water, such as for instance a pond, and picks up along with water, sand which contains ores. Heretofore the liquid output of the dredge has been pumped to a separating apparatus where the sand is treated to recover the ore therefrom. In many instances the dredge is as much as a mile and a half or two miles or even farther from the separating apparatus which made costly the pumping of the sand-carrying-liquid by reason of the fact that the sand content of the liquid was comparatively proportionately small in respect to the volume of water. The present device is located closely adjacent the dredge. The discharge from the dredge goes into the thickener which operates to provide a water-sand mixture for delivery to the separating apparatus, which has a much greater proportion of solids in the liquid than is present in the liquid when it is delivered to the thickener from the dredge. In other words, as indicated by its name, the thickener increases the proportion of the solids in the liquid. Consequently the liquid pumped from the thickener to the separating apparatus is very heavily saturated with solids, that is sand, with the result that a greater proportion of sand can be delivered to the separating apparatus in proportion to the water pumped through the pipes than was heretofore the case where the discharge of the dredge was pumped directly to the separating apparatus.

The primary object, therefore, of the invention is the thickening of the liquid of the solids suspended in a water mass.

Another object of the invention is the provision of a thickener having therein novel and improved plate and baffle arrangements to cause a rapid and efficient settling of solids within the liquid.

A still further object of the invention is the provision of a thickener so arranged as to encourage a horizontal flow through the plates of the thickener of that part of the feed to the thickener that is to be freed or substantially freed of solids.

Further objects, novel features of construction and improved results of the thickener will appear from the following description when read in the light of the accompanying drawings.

In the drawings:

Fig. 1 is a top plan view of the thickener.

Figure 2:
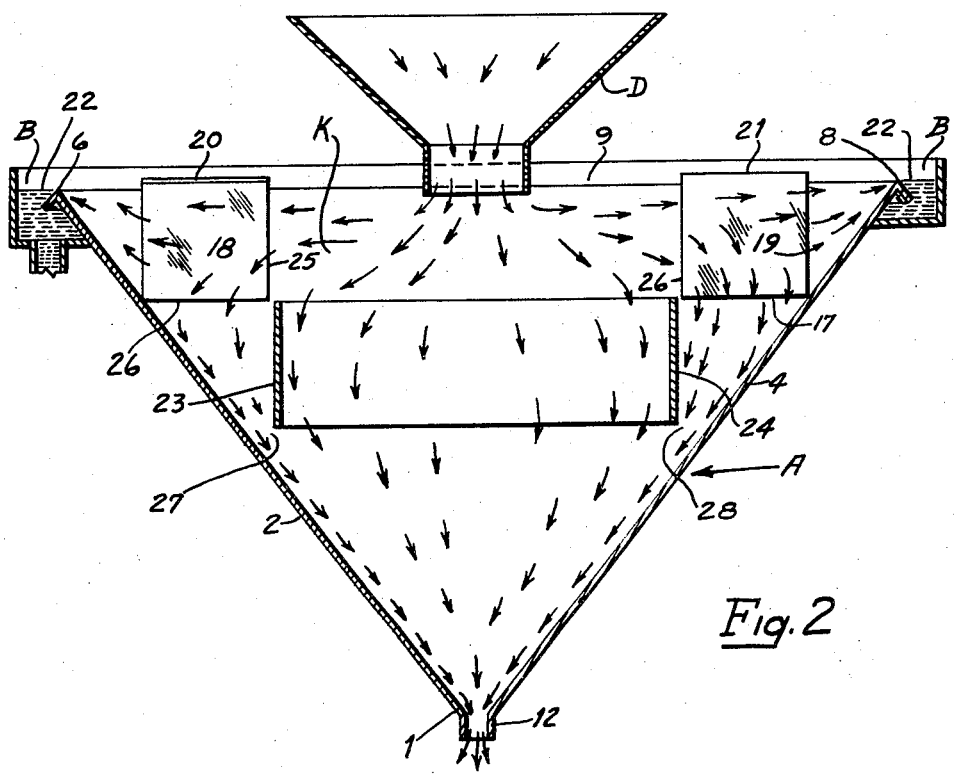
Fig. 2 is a vertical sectional view on the line 2—2 of Fig. 1.
Figure 3:
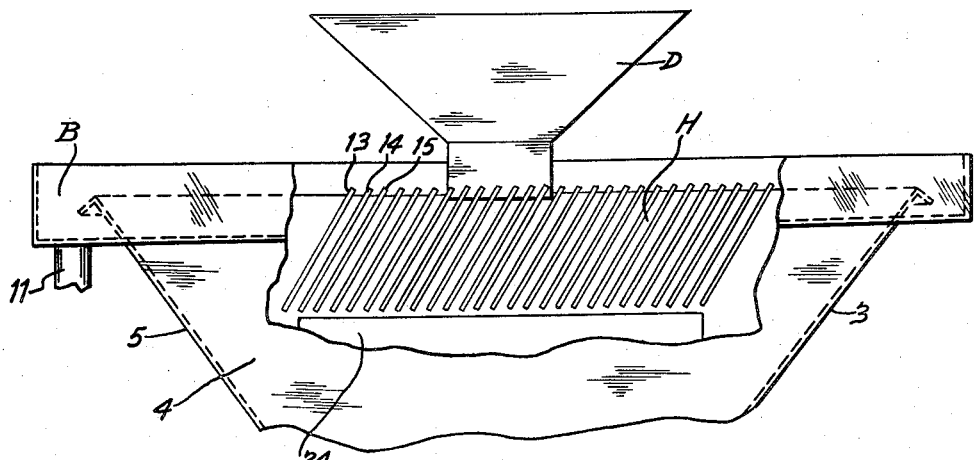
Fig. 3 is a fragmentary view in side elevation of the upper end of the thickener, the view being taken at right angles to Fig. 2 and being partly broken away to illustrate the inclination of the settling plates.

The thickener comprises a tank A which is substantially pyramidal in shape. The pyramidal tank is in inverted position in that its apex 1 is at the bottom of the tank. The side walls 2, 3, 4 and 5 are all disposed at an inclination to the vertical and substantially meet at the bottom or apex 1 of the tank.

The upper end of the tank is rectangular in shape and has four side edges or lips 6, 7, 8 and 9. An overflow launder B completely surrounds the upper end of the tank. This launder is inclined so as to provide a flow to an outlet 10 to which an overflow pipe 11 is connected. A reception box or hopper D is centrally located at the upper end of the tank and to this the liquid bearing or carrying the sand is delivered.

Internally the tank is provided with four sets of plates E, F, G and H. All of these sets of plates are identical so that description of one set will serve as a description of the others. The plate sets are arranged to define or outline a rectangle centrally positioned in the tank to form the upper end of a feed well K. At its lower end, that is at the bottom of the tank, the well is provided with an outlet or discharge 12. The liquid which flows from the discharge is thickened, as will hereinafter appear, and this liquid is delivered by a pump, not shown, or the like to the remotely positioned separating apparatus which recovers the ore from the sand which is in and carried by the liquid. The path of travel of the liquid into and from the tank is indicated by arrows in Fig. 2.

Describing a set of plates, as for instance the plate set H, it will be seen that each set is made up of a plurality of substantially rectangular and flat plates, such as the plates 13, 14 and 15. All of the plates are identical and are arranged in spaced parallel relationship to one another and disposed at an angle of approximately 60° to the vertical. That is, the plates are disposed obliquely. It has been found that a spacing of three-quarters of an inch between the plates is desirable but this exact spacing is not critical.

By reference to Fig. 2 wherein the flow of liquid within the tank is indicated, it will be seen that the edges of the plates extend at an angle to the flow of liquid across the tank toward the launders at either side thereof and that the surfaces of the plates are parallel to the current flow across the tank.

By reference to Fig. 2 it will be seen that the bottom edges 16 and 17 of the two plates designated 18 and 19 stop when they meet the side walls 2 and 3 respectively of the tank. It will also be seen that the upper edges or ends 20 and 21 of the plates extend above the liquid level 22 in the tank. The arrangement above described is true in respect to each set of plates.

There is a baffle plate associated with each set of plates. These baffles, designated 23 and 24 in Fig. 2 extend from a point adjacent the inner lower corners 25 and 26 of the plates and stop short of the adjacent side wall of the tank to provide beyond their lower ends the fluid passageways 27 and 28 as is clearly indicated by the arrows in Fig. 2. These baffles are not absolutely essential to the operation of the thickener but they tend to discourage short circuiting between the feed liquid and the clear water overflow into the launders.

The arrangement is such that that part of the feed that is to be cleared of solids is encouraged to flow horizontally through the plates. The balance of the flow of the feed can flow freely to the outlet 12.

With the plates arranged as illustrated and described the maximum distance required for any sand particle to settle before contacting the surface of a plate would be in the close neighborhood of three-fourths of an inch. Immediately a sand particle contacts a plate it will slide down to the bottom thereof thus greatly increasing the speed of settlement of the sand from the liquid. This arrangement also assures that the slower settling particles, which in the absence of the settling plates would be lost in the overflow, are settled to the bottom of the tank for ultimate delivery to the separating apparatus.

In practice it has been found that with a feed to the thickener as great as eight to ten thousand gallons per minute of a liquid carrying from twelve to eighteen percent solids with an overflow into the launders in the range of from three to five thousand gallons per minute the overflow liquid, for all practical purposes, contains no solids.

It is of course possible to control the amount of overflow into the launders. It has been found desirable to adjust or operate the thickener so that one-third of the input to the thickener moves through the plates to overflow into the launders while two-thirds of the input volume moves downwardly in the tank to discharge through the outlet 12. The result of this is that the fluid or water is materially thickened, that is, the solid content of the fluid from the discharge 12 is very materially increased over the solid content of the fluid or water delivered to the tank.

The extension of the separating plates above the liquid level is important to prevent cross flow, that is, flow at right angles to the surfaces of the separating plates.

In the example given above it will be seen that by overflowing the three to five thousand gallons per minute of substantially clear water the power cost for delivering this clear and therefore surplusage and useless water to the separating apparatus is saved. The thickener not only reduces the cost of delivery of the ore-bearing sand to the separating apparatus but additionally provides for the delivery of a greater amount of solids, over a given period of time, to the separating apparatus than would be the case where the outlet delivery of the dredge is pumped directly to the separating apparatus as has heretofore been the practice.

It is to be noted that all of the discarded liquid, that is all the liquid overflowing into the launders, must pass through the separating plates. This results in causing substantially all the sand, that is the solid matter in the liquid, to settle out so that the overflow liquid is substantially clear and contains substantially no ore-bearing sand.

It is to be further noted that the downwardly and inwardly inclined sides of the tank function to assist in settling out the solid matter as the particles of solid matter when they contact the side walls of the tank tend to roll down these walls just as the solid particles tend to run down the inclined settling plates.

What I claim is:

1. In a thickening apparatus for increasing the proportion of solid content of a liquid having solids suspended therein, a tank having downwardly inclined convergent side walls and provided with an outlet in its bottom, an overflow reception launder extending around the sides of the upper end of the tank, a plurality of series of settling elements, one series extending along each side of the upper end of the tank and extending inwardly from the side walls of the tank but stopping short of the center of the tank to provide a centrally positioned feed well, each series of settling elements composed of a plurality of spaced apart parallel plates disposed at an inclination to the vertical to provide sloping settling surfaces, the plates depending into the tank a distance to meet the adjacent side wall of the tank at a point remote to the bottom of the tank, the upper ends of the plates extending to a point above the liquid level in the tank, the faces of the plates being disposed at right angles to the upper edge of the adjacent side wall of the tank, a vertically disposed baffle extending lengthwise of each side of the tank, each baffle associated with a series of settling element plates and extending downwardly from a point closely adjacent the inner lower corners of the plates to a point adjacent but spaced from the adjacent tank side wall, the faces of said baffles being disposed at right angles to the faces of the plates forming the series of settling elements with which the baffle is associated, the parts operating whereby all liquid traveling from the feed well to the overflow launders must pass between the plates.

2. In a thickening apparatus for increasing the proportion of solid content of a liquid having solids suspended therein, a tank provided with an outlet in its bottom, an overflow reception launder extending around a side of the upper end of the tank, a series of settling elements extending along that side of the upper end of the tank which is provided with the launder and extending inwardly from the side wall of the tank but stopping short of the opposite side of the tank to provide a feed well, the series of settling elements composed of a plurality of spaced apart parallel plates disposed at an inclination to the vertical to provide sloping settling surfaces, the faces of the plates being disposed at right angles to the upper edge of the adjacent side wall of the tank, a baffle extending throughout the length of the series of plate settling elements, and said baffle extending downwardly into the tank from a point closely adjacent the inner lower corners of the plates, the parts operating whereby all liquid traveling from the feed well to the overflow launder must pass between the plates.

3. In a thickening apparatus for increasing the proportion of solid content of a liquid having solids suspended therein, a tank provided with an outlet in its bottom, an overflow reception launder extending around the sides of the upper end of the tank, a plurality of series of settling elements, one series extending along each side of the upper end of the tank and extending inwardly from the side walls of the tank but stopping short of the center of the tank to provide a centrally positioned feed well, each series of settling elements composed of a plurality of spaced apart parallel plates disposed at an inclination to the vertical to provide sloping settling surfaces the plates depending into the tank, the faces of the plates being disposed at right angles to the upper edge of the adjacent side wall of the tank, a baffle extending lengthwise of each side of the tank, each baffle associated with a series of settling element plates and extending downwardly into the tank from a point closely adjacent the inner lower corners of the plates, the faces of said baffles being disposed at right angles to the faces of the plates forming the series of settling elements with which the baffle is associated, the parts operating whereby all liquid traveling from the feed well to the overflow launders must pass between the plates.

References Cited in the file of this patent

UNITED STATES PATENTS

| 2,425,371 | Green | Aug. 12, 1947 |

FOREIGN PATENTS

| 386,312 | Great Britain | Jan. 4, 1933 |